United States Patent
Hugonnot et al.

(10) Patent No.: US 9,244,219 B2
(45) Date of Patent: Jan. 26, 2016

(54) MICROSTRUCTURED OPTICAL FIBRE HAVING A LARGE CORE AND A FLATTENED FUNDAMENTAL MODE, PRODUCTION METHOD THEREOF AND USE OF SAME IN LASER MICROFABRICATION

(71) Applicants: Commissariat à l'énergie atomique et aux énergies alternatives, Paris (FR); Universite Lille 1 Sciences et Technologies, Villenueve d'Ascq (FR); Centre National De La Recherche Scientifique, Paris (FR)

(72) Inventors: Emmanuel Hugonnot, Talence (FR); Laure Lago, Le Barp (FR); Arnaud Mussot, Hellemmes (FR); Yves Quimquenpois, Marquette lez Lille (FR); Géraud Bouwmans, Velleneuve d'Ascq (FR); Laurent Bigot, Hellemmes (FR); Constance Valentin, Croix (FR)

(73) Assignees: Commissariat a L'Energie Atomique et aux Energies Alternatives, Paris (FR); Universite Lille 1 Sciences et Technologies, Cedex (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 14/346,309
(22) PCT Filed: Sep. 18, 2012
(86) PCT No.: PCT/EP2012/068370
§ 371 (c)(1),
(2) Date: Mar. 20, 2014
(87) PCT Pub. No.: WO2013/041533
PCT Pub. Date: Mar. 28, 2013

(65) Prior Publication Data
US 2014/0233900 A1    Aug. 21, 2014

(30) Foreign Application Priority Data
Sep. 20, 2011  (FR) .................................. 11 58356

(51) Int. Cl.
*G02B 6/02* (2006.01)
*G02B 6/032* (2006.01)
(Continued)

(52) U.S. Cl.
CPC .......... *G02B 6/02338* (2013.01); *G02B 6/0238* (2013.01); *G02B 6/02314* (2013.01);
(Continued)

(58) Field of Classification Search
CPC ........... G02B 6/02338; G02B 6/02314; G02B 6/02333; G02B 6/2347; G02B 6/02352; G02B 6/02361; G02B 6/0238; G02B 6/032
USPC ............................................................ 385/125
See application file for complete search history.

(56) References Cited

U.S. PATENT DOCUMENTS 7,142,757 B1 * 11/2006 Ward .............................. 385/125
7,171,091 B1 *  1/2007 Ward .............................. 385/125
(Continued)

FOREIGN PATENT DOCUMENTS

EP        0724171 A2     7/1996

OTHER PUBLICATIONS

J. W. Dawson, R. J. Beach, I. Jovanovic, B. Wattellier, Z. M. Liao, S. A. Payne, and C. P. Barty, "Large flattened mode optical fiber for high output energy pulsed fiber lasers," in Conference on Lasers and Electro-Optics/Quantum Electronics and Laser Science Conference, Technical Digest (Optical Society of America, 2003), paper CWD5.
(Continued)

*Primary Examiner* — Ryan Lepisto
(74) *Attorney, Agent, or Firm* — Nixon Peabody LLP

(57) ABSTRACT

The fiber comprises a core (2) having an index N and diameter of 10 μm or more, surrounded by a ring (4) having an index N+Δn and thickness ΔR, and cladding (6) surrounding the ring and comprising for example air gaps (8). According to the invention: $\Delta n \geq 10^{-3}$ and $\Delta R = \alpha/(\Delta n)^\beta$ [1] where: $5 \times 10^{-4}$ μm$\leq \alpha \leq 5 \times 10^{-2}$ μm and $0.5 \leq \beta \leq 1.5$. The numbers α and β are dependent on the wavelength λ of the light guided by the fiber, the number of missing gaps therein, the diameter d of the gaps, the spacing Λ thereof and N. To design the fiber, λ, the number of missing gaps, d/Λ, the core doping content, Λ and Δn are chosen; and ΔR is determined using equation [1] so as to obtain a flattened fundamental mode.

10 Claims, 3 Drawing Sheets

(51) Int. Cl.
*G02B 6/036* (2006.01)
*C03B 37/012* (2006.01)

(52) U.S. Cl.
CPC ........ *G02B6/02333* (2013.01); *G02B 6/02352* (2013.01); *G02B 6/02361* (2013.01); *G02B 6/032* (2013.01); *C03B 37/0122* (2013.01); *C03B 2201/02* (2013.01); *C03B 2201/31* (2013.01); *C03B 2201/36* (2013.01); *C03B 2203/14* (2013.01); *C03B 2203/22* (2013.01); *C03B 2203/42* (2013.01); *G02B 6/02347* (2013.01); *G02B 6/03611* (2013.01); *Y10T 29/49769* (2015.01)

(56) References Cited

U.S. PATENT DOCUMENTS

| | | | |
|---|---|---|---|
| 8,755,658 B2* | 6/2014 | Proulx | 385/125 |
| 2004/0247272 A1 | 12/2004 | Dawson et al. | |
| 2008/0199135 A1* | 8/2008 | Proulx | 385/123 |
| 2009/0201953 A1* | 8/2009 | Peyghambarian et al. | 372/6 |
| 2010/0247046 A1* | 9/2010 | Dong et al. | 385/123 |

OTHER PUBLICATIONS

Xing-Qiang Lu, Qin-Ling Zhou, Jian-Rong Qiu, Cong-Shan Zhu and Dian-Yuan Fan, "Design guidelines and characteristics of beam-shaping microstructure optical fibers", Optics Communications, vol. 259, Issue 2, Mar. 15, 2006, pp. 636-639.

Kunimasa Saitoh, Yukihiro Tsuchida and Masanori Koshiba, "Endlessly single-mode holey fibers: the influence of core design", Optics Express, Optical Society of America, vol. 13, No. 26, Dec. 26, 2005, pp. 10833-10839.

Chun can Wang, Fan Zhang, Yu chun Lu, Chu Liu, Rui Geng, Ti gang Ning and Shui sheng Jian, "Single-mode operations in the large flattened mode optical fiber lasers and amplifiers", Journal of Optics A: Pure and Applied Optics, IOP Publishing Ltd, vol. 11, 2009, 065402 (5 pages).

N. N. Elkin, A. P. Napartovich, V. N. Troshchieva and D. V. Vysotsky, "Modeling of Large Flattened Mode Area Fiber Lasers", Laser Physics, 2010, vol. 20, No. 2, pp. 304-310.

Philip St.J. Russell, "Photonic-Crystal Fibers", Journal of Lightwave Technology, vol. 24, No. 12, Dec. 2006, pp. 4729-4749.

D. Lin, S. U. Alam, A. Malinowski, K. K. Chen, J. R. Hayes, J. C. Flannagan, V. Geddes, J. Nilsson, S. Ingram, S. Norman and D. J. Richardson, "Temorally and spatially shaped fully-fiberized ytterbium-doped pulsed MOPA", Laser Physics Letters, vol. 8, No. 10, pp. 747-753 (2011).

J. D. Love, W. M. Henry, W. J. Stewart, R. J. Black, S. Lacroix, F. Gonthier, "Tapered single-mode fibres and devices, Part 1: Adiabaticity criteria", IEE Proceedings-J., vol. 138, No. 5, Oct. 1991, pp. 343-354.

Dawson, Jay W. et al., "Large Flattened Mode Optical Fiber for Reduction of Non-Linear Effects in Optical Fiber Lasers", Proceedings of SPIE, vol. 5335, pp. 132-139, Jan. 1, 2004.

Ghatak, A.K. et al., "Design of Waveguide Refractive Index Profile to Obtain Flat Modal Field", Proceedings of SPIE, vol. 3666, pp. 40-44, Jan. 1, 1998.

Wang, Chun-can et al., "Photonic Crystal Fiber with a Flattened Fundamental Mode for the Fiber Lasers", Optics Communications, vol. 282, Issue 11, pp. 2232-2235, Jun. 2009.

International Search Report and Written Opinion in International Application No. PCT/EP2012/068370, mailed Oct. 26, 2012.

Rapport de Recherche Preliminaire, Institut National de la Propriete Industrielle, (cited references in English) FA 756526 (FR 1158356) dated Jun. 5, 2012.

* cited by examiner

MICROSTRUCTURED OPTICAL FIBRE HAVING A LARGE CORE AND A FLATTENED FUNDAMENTAL MODE, PRODUCTION METHOD THEREOF AND USE OF SAME IN LASER MICROFABRICATION

CROSS-REFERENCE TO RELATED PATENT APPLICATION

The present application is a National Stage Application of International Application No. PCT/EP2012/068370 entitled "Microstructured Optical Fibre Having A Large Core And A Flattened Fundamental Mode, Production Method Thereof And Use Of Same In Laser Microfabrication" filed Sep. 18, 2012, which claims priority to French Patent Application No. 1158356, filed Sep. 20, 2011, the contents of which are incorporated herein by reference in their entirety.

FIELD OF THE INVENTION

The present invention relates to a microstructured optical fibre having a large core, suitable for obtaining a flattened fundamental mode, and a method for producing this fibre.

The term "large core" denotes a core wherein the diameter equals at least 10 µm. The term "flattened fundamental mode" denotes a fundamental mode wherein the intensity has a flattened transverse profile; it should be noted that the fundamental mode diameter in this case exhibits little difference in relation to the core diameter; and if the latter is large (greater than or equal to 10 µm), the fundamental mode diameter is thus also large.

The invention notably applies to laser microfabrication methods, for example laser marking methods and laser cutting methods, or methods associated with light-biological tissue interaction for therapy and diagnostics.

STATE OF THE RELATED ART

In order to obtain an optical fibre having a flattened fundamental mode, it is known to place, around the fibre core, a ring wherein the optical index is slightly greater than that of said core.

In this respect, reference may be made to document [1] which, like the other documents [2] to [7] cited hereinafter, is mentioned at the end of the present description.

However, the optical fibre described in document [1] has the drawback of having a small diameter core.

The use of a ring around a large core doped with rare earths is known from documents [2] and [3]. However, the optical fibre in question in these documents is multimode and, to obtain a single mode, i.e. the fundamental mode, at the output of this fibre, discrimination is performed using the gain. Indeed, compared to other modes, the flattened fundamental mode has a superior overlap on the doped core.

This consists of the only experimental embodiment of a flattened large mode known in the prior art. The experimental image of the mode obtained at the fibre output is found in FIG. 7 of document [4]. The profile obtained is very imperfect. This is attributed to the practical embodiment of the fibre, which is not suitable for obtaining perfect index steps.

An optical fibre suitable for confining the mode by means of an air-gap structure, and for flattening the mode by means of a ring, is known from document [5]. The ratio d/Λ of the diameter $\underline{d}$ of the air gaps of the microstructure described, in relation to the spacing Λ of these gaps, is in the region of 0.4; this gives rise to a multimode core for this type of structure. However, no experimental demonstration is given.

Furthermore, the parameters of the fibre described in document [5] appear to be unrealistic. In particular, the difference in the optical index between the ring and the core is extremely small—it equals $3 \times 10^{-4}$—and it is extremely difficult, or even impossible, to obtain during fibre production.

A microstructured optical fibre, having a very small doped core (a few micrometers in diameter) and without a ring, is also known from document [6].

In fact, no satisfactory solution for obtaining, at the output of a passive optical fibre, a single flattened mode having a diameter at least equal to 10 µm is known to date:

the passive core fibres proposed in documents [1] and [6] are only suitable for obtaining a small mode size (effective area less than 100 µm²);

the multimode aspect of the fibre design known from document [2] requires the use of this fibre when amplification is required, in order to benefit from gain discrimination. However, in some cases (spatial shaping, power transportation, non-linear amplification for example), it is essential to have a passive fibre; note that in some cases, curvature discrimination is however possible;

the fibre parameters proposed in document [5], notably the index difference of the ring of this fibre, is extremely difficult, or impossible, to carry out experimentally.

As a general rule, the designs proposed in the prior art are not realistic since they do not account for production constraints. The prior art merely includes one experimental embodiment of a flattened fundamental mode fibre (see document [2]).

This embodiment is however relatively unconvincing since the light beam obtained at the fibre output cannot be considered to be flattened (see document [4]). Furthermore, the authors of document [2] acknowledge that the practical embodiment of the fibre is not suitable for obtaining sufficiently controlled index steps.

DESCRIPTION OF THE INVENTION

The present invention relates to a microstructured optical fibre, not having the drawbacks of those mentioned above.

Specifically, the present invention relates to a microstructured optical fibre having a large core and a flattened fundamental mode, comprising:

a core wherein the diameter equals at least 10 µm, a ring surrounding the core, wherein the optical index exceeds that of the core by a value Δn and wherein the outer radius exceeds the inner radius by a value ΔR, and an optical cladding surrounding the ring and comprising a matrix containing inclusions, for example longitudinal air gaps, wherein the optical index is different to that of the matrix, the equivalent mean optical index $n_{FSM}$ of the cladding being less than the optical index of the core, characterised in that Δn is greater than $10^{-3}$ and ΔR is linked with Δn by the equation $\Delta R = \alpha/(\Delta n)^\beta$ where α is in the interval ranging from $5 \times 10^{-4}$ µm to $5 \times 10^{-2}$ µm, β is in the interval ranging from 0.5 to 1.5 and α and β are dependent on the wavelength λ of the light to be guided by the microstructured optical fibre, the number of missing inclusions therein (due to the presence of the core and the ring), the diameter $\underline{d}$ of the inclusions, the spacing Λ thereof and the optical index of the core.

According to one preferred embodiment of the microstructured optical fibre, according to the invention, the number of missing inclusions is equal to 7. The fibre is then said to have a defect of 7.

The core of the microstructured optical fibre, according to the invention, may be doped or non-doped.

For example, it may be doped with light-emitting entities (for example, rare earth ions) or not doped with such entities.

According to a first particular embodiment of the invention, the core is made of non-doped silica, β equals 1 and α is given by the following formula:

$$\alpha = 2.489 \times 10^{-2} (d/\Lambda)^{0.25} \lambda^2 / \Lambda$$

where α is expressed in micrometers when d, Λ and λ are also expressed as such.

According to a second particular embodiment of the invention, the core is made of silica doped, for example with ytterbium and aluminium or another codopant such as phosphorus or germanium, so as to increase the optical index of pure silica by approximately $1.5 \times 10^{-3}$, β equals 0.905 and α is given by the following formula:

$$\alpha = 1.046 \times 10^{-2} (\lambda/\Lambda)^{0.19}$$

where α is expressed in micrometers when Λ and λ are also expressed as such.

According to a third particular embodiment of the invention, the core is made of silica doped, for example with ytterbium and aluminium or another codopant such as phosphorus or germanium, so as to increase the optical index of pure silica by approximately $5 \times 10^{-3}$, β equals 0.87 and α is given by the following formula:

$$\alpha = 1.327 \times 10^{-2} (\lambda/\Lambda)^{0.05}$$

where α is expressed in micrometers when Λ and λ are also expressed as such.

The present invention also relates to a method for producing the microstructured optical fibre according to the invention, wherein:
  λ is chosen,
  the number of missing inclusions is chosen,
  the ratio d/Λ is chosen,
  the doping content T of the core is chosen, T being greater than or equal to 0,
  Λ is chosen,
  Δn is chosen, and
  ΔR is determined using said equation so as to obtain a flattened fundamental mode at the fibre output when light having a wavelength λ is injected at the input thereof, and
  the microstructured optical fibre is produced, with the number of inclusions and parameters d, T, Λ, Δn thus chosen, and the parameter ΔR determined in this way.

The present invention further relates to a laser microfabrication method, wherein the microstructured optical fibre according to the invention is used for guiding the light emitted by the laser.

BRIEF DESCRIPTION OF THE FIGURES

The present invention will be understood more clearly on reading the description of examples of embodiments given hereinafter, merely as an indication and not as a limitation, with reference to the appended figures wherein.

DETAILED DESCRIPTION OF PARTICULAR EMBODIMENTS

Figure 1A:
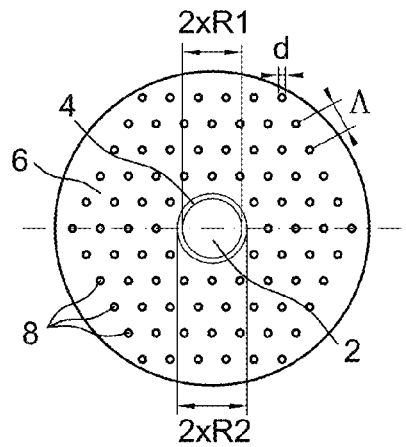
FIG. 1A is a schematic cross-sectional view of an example of the microstructured optical fibre according to the invention.
Figure 1B:
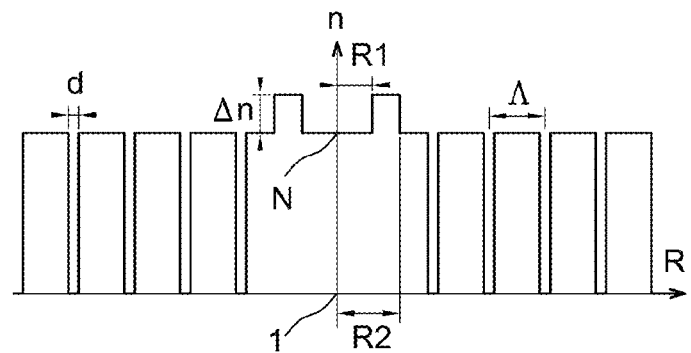
FIG. 1B shows the radial profile of the optical index for this example of a fibre.

FIG. 1A is a schematic cross-sectional view of an example of the microstructured optical fibre invention, suitable for obtaining a flattened fundamental mode, having a large diameter. FIG. 1B shows the index profile of the fibre represented in FIG. 1A, along a horizontal section, i.e. the variations of the optical index n as a function of the radius R (radial profile).

The benefit of microstructuring is notably that of providing quasi-single-mode behaviour, even for a large core in relation to the wavelength λ of the light propagated in the fibre.

The fibre shown in FIG. 1A comprises:
  a central part consisting of a core 2 wherein the optical index is annotated N, and a ring 4 wherein the optical index is equal to N+Δn where Δn (index step) is strictly positive, and
  optical cladding 6 surrounding the ring 4, comprising air inclusions and having an equivalent mean optical index $n_{FSM}$ less than the optical index N of the core 2.

More specifically, in the example shown in FIG. 1A, the optical cladding 6 comprises longitudinal gaps 8 parallel with the axis of the fibre. The cladding 6 consists of the same material as the core but, due to the existence of these gaps, the index $n_{FSM}$ is less than N.

In the example, the core 2 is made of pure silica; the ring 4 has a sub-micronic thickness and it is made of silica lightly doped with germanium; the inner radius of the ring is annotated R1, the outer radius thereof R2 and the thickness thereof ΔR (ΔR=R2−R1); and the cladding 6 is of the air-silica type. Note that the diameter of the core 2 equals 2R1, where 2R1≥10 μm according to the invention.

The microstructuring parameters are the diameter d of the air gaps 8 and the spacing Λ thereof.

As seen in FIG. 1A, so as to form the core 2 surrounded by the ring 4, the seven central gaps or capillaries are replaced by the solid material, forming the core and forming the ring. The fibre is said to have a defect of 7.

This geometry is suitable for enlarging the size of the fundamental mode without enlarging the pitch Λ of the gap network excessively. It should be noted that, for such a geometry, a ratio d/Λ equal to 0.046 would be required to obtain a single propagation mode regardless of λ/Λ (see document [7]).

The ratio d/Λ should be as small as possible (typically d/Λ less than 0.25) so that the number of guided modes is as small as possible.

The outer radius R2 of the ring 4 is defined by the production of the fibre. Due to the positioning of the capillaries used to form the cladding 6, a spacing at least equal to Λ/2 is required between the outer cylinder, having a radius R2, defining the ring 4, and the centre of the first air gap encountered, equivalent to a maximum outer radius equal to $$(2\sqrt{3}-1)\frac{\Lambda}{2}.$$

Flattened mode is obtained when the fundamental mode of the ring reaches the cut-off wavelength thereof (i.e. when the effective index of this mode becomes equal to the refractive index of the core material). The flatness of the transverse intensity profile of the fundamental mode is optimised for the pair (Δn; ΔR). An example of optimisation for d/Λ=0.25 is given in FIG. 2. It is noted that Δn (index step or index contrast) is the difference between the optical index of the ring 4 and that of the core 2, and that ΔR is the thickness of the ring.

Figure 2:
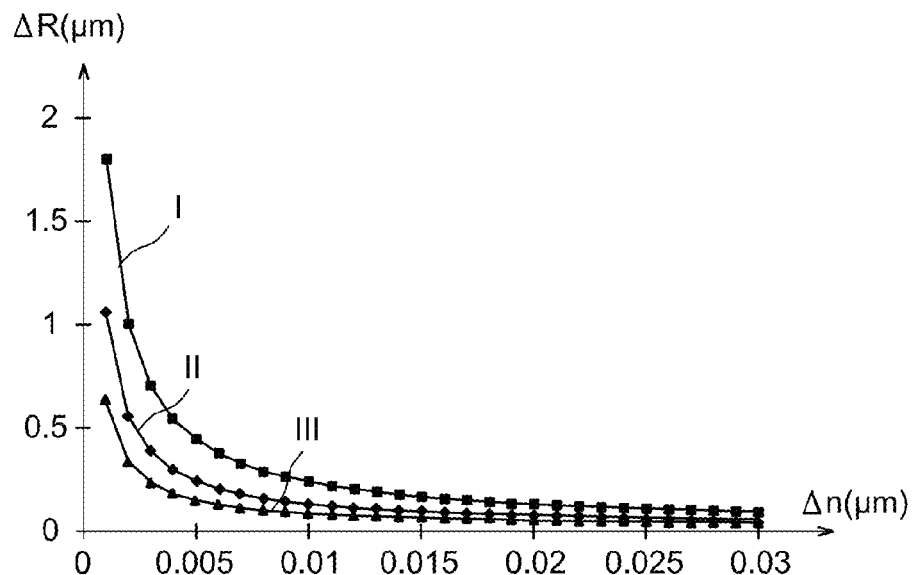
FIG. 2 shows the variations of the thickness ΔR of the ring, suitable for obtaining a flattened profile, for the optical fibre in FIG. 1A, according to the index contrast Δn, for a defect of 7 and various values of the spacing Λ.

More specifically, FIG. 2 gives the thickness of the ring suitable for obtaining a flattened profile, as a function of the index contract, for a defect of 7, for several spacings Λ between the air gaps, i.e. Λ=8.5 μm (curve I), Λ=17 μm (curve II) and Λ=30 μm (curve III) and for d/Λ=0.25.

Figure 3A:
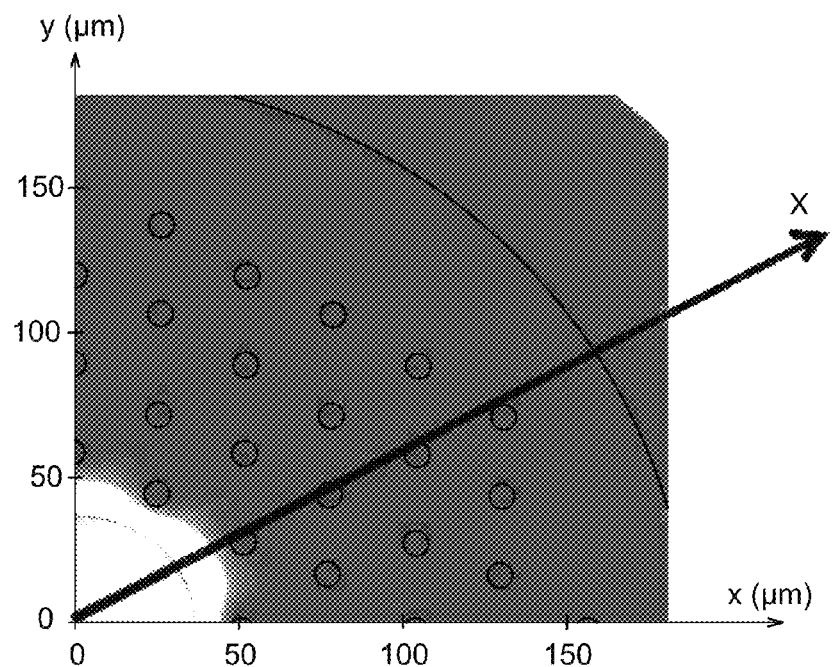
FIG. 3A shows the transverse profile of the mode guided in this fibre when Λ equals 30 μm and Δn equals $2 \times 10^{-3}$.

FIG. 3A shows the transverse profile of the mode guided in the microstructured fibre, shown in FIG. 1A (defect of 7), for a pitch Λ of 30 μm, an index contrast Δn of $2 \times 10^{-3}$ and a ratio d/Λ of 0.25. For this index contrast, FIG. 2 demonstrates that the thickness ΔR of the ring should be equal to 305 nm.

Figure 3B:
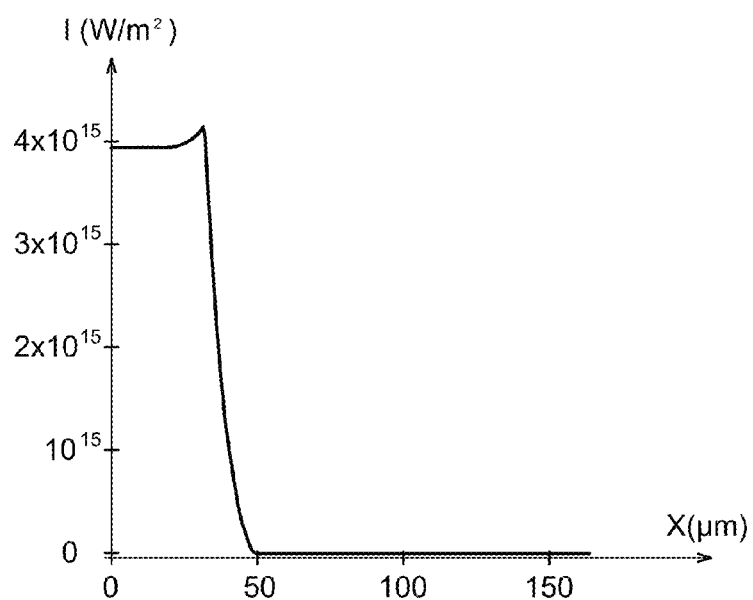
FIG. 3B shows the variations of the light intensity I in the fibre, along the axis X in FIG. 3A, forming an angle of π/6 (30°) with the horizontal axis x in FIG. 3A.

FIG. 3B shows the variations in light intensity I (in W/m²) along the axis X in FIG. 3A, forming an angle of π/6 rd (30°) with the horizontal axis x in FIG. 3A.

It should be noted that only a quarter of the fibre is shown in FIG. 3A for symmetry reasons. The effective area of the fundamental mode obtained is in this case 6420 μm² for the entire structure.

The structure shown in FIG. 1A and the variation in the thickness of the ring as a function of the index contrast, given in FIG. 2, are suitable for obtaining a flattened fundamental mode. Unlike the design proposals presented in the prior art, the optical fibre parameters are calculated, in the present invention, accounting for production constraints.

There is thus question of an enhancement of the designs known in the prior art. This enhancement makes it possible to solve the problem of producing an optical fibre having a flattened fundamental mode, which had not been previously solved.

The index contrasts Δn, that can be read in FIG. 2, are suitable for being obtained, for example using the OVD (outside vapour deposition) technique, either by depositing silica having an index N+Δn around a rod of pure silica (index N), or by depositing pure silica (index N) around a doped silica core, having an index N−Δn. The current production technology is suitable for controlling the dimensions of the ring within a few percent and obtaining an index contrast within $5 \times 10^{-4}$.

Figure 4:
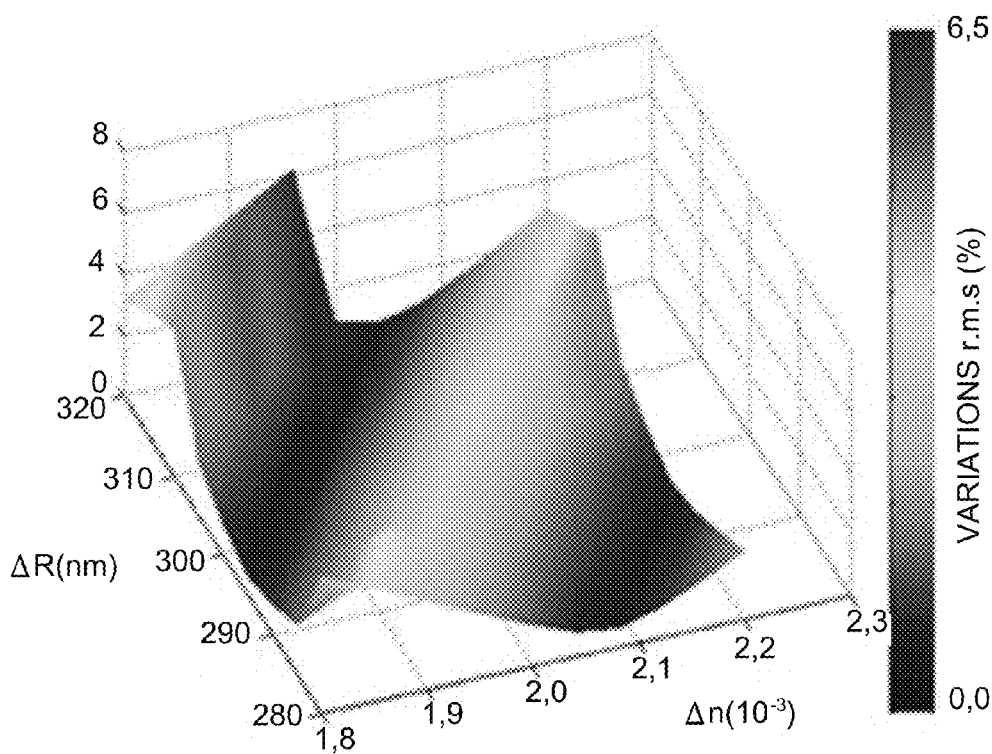
FIG. 4 is a diagram of r.m.s (root mean square) flatness variations expressed as a %, according to Δn and ΔR, when Λ equals 30 μm.

FIG. 4 is a diagram of the flatness variations (r.m.s. variations expressed as a %) for an optical fibre having a defect of 7, a pitch Λ of 30 μm and a ratio d/Λ of 0.25, as a function of the parameters Δn and ΔR.

In FIG. 4, it is seen that Δn varies around $2 \times 10^{-3}$ and ΔR around 300 nm. These variations are calculated on the basis of the modulation rate $$M_{spa} = \frac{\sqrt{\langle I^2(x,y)\rangle_{80\% \, surface} - \langle I(x,y)\rangle^2_{80\% \, surface}}}{\langle I(x,y)\rangle_{80\% \, surface}}$$

where the symbol < > corresponds to the mean value calculated on 80% of the mode surface.

The variation values, defined by $M_{spa}$, are thus less than 7%, even for a greater range of values of ΔR (radius differential) than typical production precision.

In the present invention, the structuring parameters of the optical fibre and the uncertainties in respect of these parameters are compatible with current production technologies, unlike the optical fibres known in the prior art.

In particular, although the dimensioning of the optical fibre disclosed by document [5] appears to be close to the dimensioning of an optical fibre according to the present invention, this fibre, known from document [5], is not experimentally feasible, unlike a fibre according to the invention.

It should further be noted that, in the present invention, in order to obtain a dimensioning accounting for production constraints, it is necessary to perform numerical optimisations. The parameters used are thus not obtained directly using a law or values known in the prior art.

It should also be noted that, in spite of the significant interest represented by a flattened fundamental mode fibre, the prior art merely includes one experimental embodiment of such a fibre (see document [2]). Furthermore, this known experimental embodiment is relatively unconvincing since the intensity of the beam obtained at the fibre output is very slightly flattened (see document [4]). This clearly demonstrates that the dimensioning is not obvious.

Figure 5:
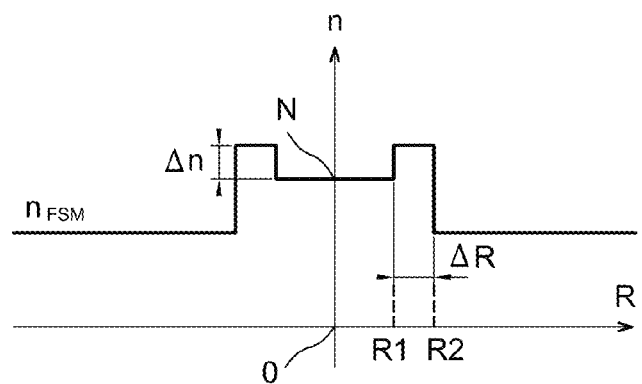
FIG. 5 shows the radial profile of the optical index of an optical fibre according to the invention.

The reasoning used for dimensioning an optical fibre according to the invention is specified hereinafter:
the wavelength λ of the light guided in the fibre is chosen (for example λ=1 μm or λ=1.55 μm),
the number of capillaries replaced by a solid core in the gap structure is chosen (for example a defect of 7),
the ratio d/Λ is chosen (for example d/Λ=0.12),
the doping content T of the core with luminescent ions (T≥0) is chosen, determining the index of the core N (see FIG. 5), and
the spacing between the air gaps Λ is chosen, determining the diameter of the gaps d, the outer radius R2 (FIG. 5) and the equivalent mean index $n_{FSM}$ of the optical cladding.

There is thus an equation between the thickness ΔR of the ring and the index contrast Δn. This equation is as follows:

$$\Delta R = \frac{\alpha}{(\Delta n)^\beta}. \qquad (1)$$

The values of the parameters α (expressed in μm) and β are dependent on the parameters chosen above (wavelength λ, value of defect, ratio d/Λ, value N of the optical index of the core resulting from a possible doping, spacing Λ between the air gaps).

The values of the parameters α and β are given hereinafter for various configurations.

I) The core is made of non-doped silica.
α is given by the following formula:

$$\alpha = 2.489 \times 10^{-2} (d/\Lambda)^{0.25} \lambda^2 / \Lambda$$

where α is expressed in micrometers when d, Λ and λ are also expressed in micrometers; and β equals 1.

II) The core is made of doped silica (for example with ytterbium and aluminium or another codopant such as phosphorus or germanium); and the doping gives rise to a difference in index in relation to pure silica of approximately $\delta n = 1.5 \times 10^{-3}$.

$\alpha$ is given by the following formula:

$$\alpha = 1.046 \times 10^{-2} (\lambda/\Lambda)^{0.19}$$

where $\alpha$ is expressed in micrometers when $\Lambda$ and $\lambda$ are also expressed in micrometers; and $\beta$ equals 0.905.

III) The core is doped (for example with ytterbium and aluminium or another codopant such as phosphorus or germanium); and the doping gives rise to a difference in index in relation to pure silica of approximately $\delta n = 5 \times 10^{-3}$.

$\alpha$ is given by the following formula:

$$\alpha = 1.327 \times 10^{-2} (\lambda/\Lambda)^{0.05}$$

where $\alpha$ is expressed in micrometers when $\Lambda$ and $\lambda$ are also expressed in micrometers; and $\beta$ equals 0.87.

As a general rule, the greater the doping of the core, the smaller the variation of $\alpha$ as a function of $\Lambda$ (the structure of the optical cladding has less effect on the optimal values of the parameters $\Delta n$ and $\Delta R$ in relation to the ring).

It is important to note that the variations between the thickness $\Delta R$ of the ring and the index contrast $\Delta n$, resulting from equation (1) and the above values, are different to those given by the analytical formula featured in document[5]. The results given by this formula are too approximate for the resulting design to produce a flattened fundamental mode.

It is specified that, as a general rule: $\Delta n > 10^{-3}$, $5 \times 10^{-4}$ μm $< \alpha < 5 \times 10^{-2}$ μm, and $0.5 < \beta < 1.5$.

The present invention has various benefits and applications in the field of fibre laser systems:

it is suitable for converting a light beam wherein the intensity has a Gaussian profile into a light beam wherein the intensity has a flattened profile (spatial shaping);

it is suitable for optimising the far-field intensity of the beam for laser micromachining applications (notably marking and welding);

in relation to a passive fibre (i.e. non-luminescent), wherein the fundamental mode has an equivalent effective area but wherein the fundamental mode is Gaussian, the decrease in the peak intensity, due to the flattened mode, is suitable for increasing the energy (or power) suitable for being propagated (hence high-energy beam transport applications) or suitable for being obtained at the output of apparatuses based on non-linear amplification (notably apparatuses using four-wave mixing and apparatuses using the Raman effect); and if the fibre core is doped with luminescent ions, the invention is suitable for producing flat-mode fibre lasers and amplifiers, suitable for increasing the energy (or power) that can be extracted from such systems.

In the examples given above, a microstructured fibre having a defect of 7 (7 missing gaps) is taken into consideration. However, the present invention is not limited to this value: the fibre could have a defect of another value, for example 19, or even 1.

Furthermore, in the examples given above, air inclusions (longitudinal gaps) in the optical cladding of the microstructured fibre have been taken into consideration. However, other inclusions are possible, for example doped silica inclusions or inclusions of other gases such as argon for example.

The documents cited in the present description are as follows:

[1] A. K. Ghatak, I. C. Goyal and R. Jindal, "Design of Waveguide Refractive Index Profile to Obtain Flat Modal Field", Proc. SPIE 3666, 40-44 (1998)

[2] J. W. Dawson, R. Beach, I. Jovanovic, B. Wattellier, Z. Liao, S. A. Payne and C. P. J. Barty, "Large flattened mode optical fiber for high output energy pulsed fiber lasers", paper CWD5, CLEO 2003

[3] J. W. Dawson, R. J. Beach, S. A. Payne, M. D. Feit, C. P. J. Barty and Z. M. Liao, "Flattened Mode Cylindrical and Ribbon Fibers and Amplifiers", US 2004/0247272 (9 Dec. 2004)

[4] J. W. Dawson, R. Beach, I. Jovanovic, B. Wattellier, Z. Liao, S. A. Payne and C. P. J. Barty, "Large flattened mode optical fiber for reduction of non-linear effects in optical fiber lasers", Proc. SPIE 5335, 132-139 (2004)

[5] C. Wang, F. Zhang, Y. Lu, C. Liu, R. Geng and T. Ning, "Photonic crystal fiber with a flattened fundamental mode for the fiber lasers", Opt. Commun. 282, 2232-2235 (2009)

[6] X. Lu, Q. Zhou, J. Qiu, C. Zhu and D. Fan, "Design guidelines and characteristics of beam-shaping microstructure optical fibers", Opt. Commun. 259, 636-639 (2006)

[7] K. Saitoh, Y. Tsuchida, M. Koshiba and N. Asger Mortensen, "Endlessly single-mode holey fibers: the influence of core design", Opt. Express 26, 10833 (2005).

The invention claimed is:

1. Microstructured optical fibre having a large core and a flattened fundamental mode, comprising:

a core wherein the diameter equals at least 10 μm, a ring surrounding the core, wherein the optical index exceeds that of the core by a value $\Delta n$ and wherein the outer radius exceeds the inner radius by a value $\Delta R$, and an optical cladding surrounding the ring and comprising a matrix containing inclusions, wherein the optical index is different to that of the matrix, the equivalent mean optical index $n_{FSM}$ of the cladding being less than the optical index of the core, wherein $\Delta n$ is greater than $10^{-3}$ and $\Delta R$ is linked with $\Delta n$ by the equation $\Delta R = \alpha/(\Delta n)^{\beta}$ where $\alpha$ is in the interval ranging from $5 \times 10^{-4}$ μm to $5 \times 10^{-}$μm, $\beta$ is in the interval ranging from 0.5 to 1.5 and $\alpha$ and $\beta$ are dependent on the wavelength $\lambda$ of the light to be guided by the microstructured optical fibre, the diameter d of the inclusions, the spacing $\Lambda$ of the inclusions and the optical index of the core.

2. Microstructured optical fibre according to claim 1, wherein the core is not doped.

3. Microstructured optical fibre according to claim 2, wherein the core is made of non-doped silica, $\beta$ equals 1 and $\alpha$ is given by the following formula:

$$\alpha = 2.489 \times 10^{-2} (d/\Lambda)^{0.25} \lambda^2 / \Lambda$$

where $\alpha$ is expressed in micrometers when d, $\Lambda$ and $\lambda$ are also expressed in, micrometers.

4. Microstructured optical fibre according to claim 1, wherein the core is doped.

5. Microstructured optical fibre according to claim 4, wherein the core is made of doped silica so as to increase the optical index of pure silica by approximately $1.5 \times 10^{-3}$, $\beta$ equals 0.905 and $\alpha$ is given by the following formula:

$$\alpha = 1.046 \times 10^{-2} (\lambda/\Lambda)^{0.19}$$

where $\alpha$ is expressed in micrometers when $\Lambda$ and $\lambda$ are also expressed in micrometers.

6. Microstructured optical fibre according to claim 5, wherein the silica is doped with ytterbium and aluminum or another codopant.

7. Microstructured optical fibre according to claim 6, wherein the codopant is phosphorus or geranium.

8. Microstructured optical fibre according to claim 4, wherein the core is made of doped silica, so as to increase the optical index of pure silica by approximately $5\times10^{-3}$, $\beta$ equals 0.87 and $\alpha$ is given by the following formula:

$$\alpha=1.327\times10^{-2}(\lambda/\Lambda)^{0.05}$$

where $\alpha$ is expressed in micrometers when $\Lambda$ and $\lambda$ are also expressed in micrometers.

9. Microstructured optical fibre according to claim 8, wherein the silica is doped with ytterbium and aluminum or another codopant.

10. Microstructured optical fibre according to claim 1, wherein the inclusions are longitudinal air gaps.

* * * * *